United States Patent [19]

Figlia

[11] 4,077,360
[45] Mar. 7, 1978

[54] PET FEEDING APPARATUS

[75] Inventor: Anthony G. Figlia, Rego Park, N.Y.

[73] Assignee: F. G. Waide, Inc., New York, N.Y.

[21] Appl. No.: 706,003

[22] Filed: Jul. 16, 1976

[51] Int. Cl.² ............................................. A01K 5/02
[52] U.S. Cl. ................................................ 119/51.12
[58] Field of Search .............. 119/51.11, 51.12, 51.13; 30/423; 222/81; 221/150 R, 150 HC; 99/357

[56] References Cited

U.S. PATENT DOCUMENTS

| | | | |
|---|---|---|---|
| 2,534,444 | 12/1950 | Hedwall et al. ................... | 119/51.12 |
| 3,423,825 | 1/1969 | Frost et al. .............................. | 30/423 |
| 3,720,186 | 3/1973 | O'Rourke .......................... | 119/51.12 |
| 3,780,702 | 12/1973 | Waterburg .......................... | 119/51.13 |

*Primary Examiner*—Hugh R. Chamblee
*Attorney, Agent, or Firm*—Norbert P. Holler

[57] ABSTRACT

An apparatus for a single feeding of an unattended pet out of an initially hermetically sealed can of pet food is disclosed. The apparatus includes an electric motor-driven can opener arranged in a housing, and a presettable timer which operates a switch to close the energization circuit for the motor at the time the feeding is to take place. The can-opening mechanism includes a cutter blade and can-turning gear combination, a vertically reciprocatable slide member supporting the cutter blade and a cam follower, and a power gear and box cam combination driven by the motor for vertically displacing the cam follower. In operation, when the motor is started to effect rotation of the gear, the cam forces the cam follower and therewith the slide member downwardly slightly, so that the cutter blade is forced through the lid of the can at the beginning of the cycle and is then held there while the can turns to sever the lid from the body of the can. At the end of the cycle, a rise in the cam raises the cam follower and the slide member to retract the cutter blade upwardly and thereby to release the can and concurrently to open the motor energization circuit. A ramp is provided below the cutter blade and turning gear combination for guiding the lidless released can to a receiving location outside the housing where the can will be accessible to the animal to be fed. This abstract is not to be taken either as a complete exposition or as a limitation of the present invention, however, the full nature and extent of the invention being discernible only by reference to and from the entire disclosure.

12 Claims, 10 Drawing Figures

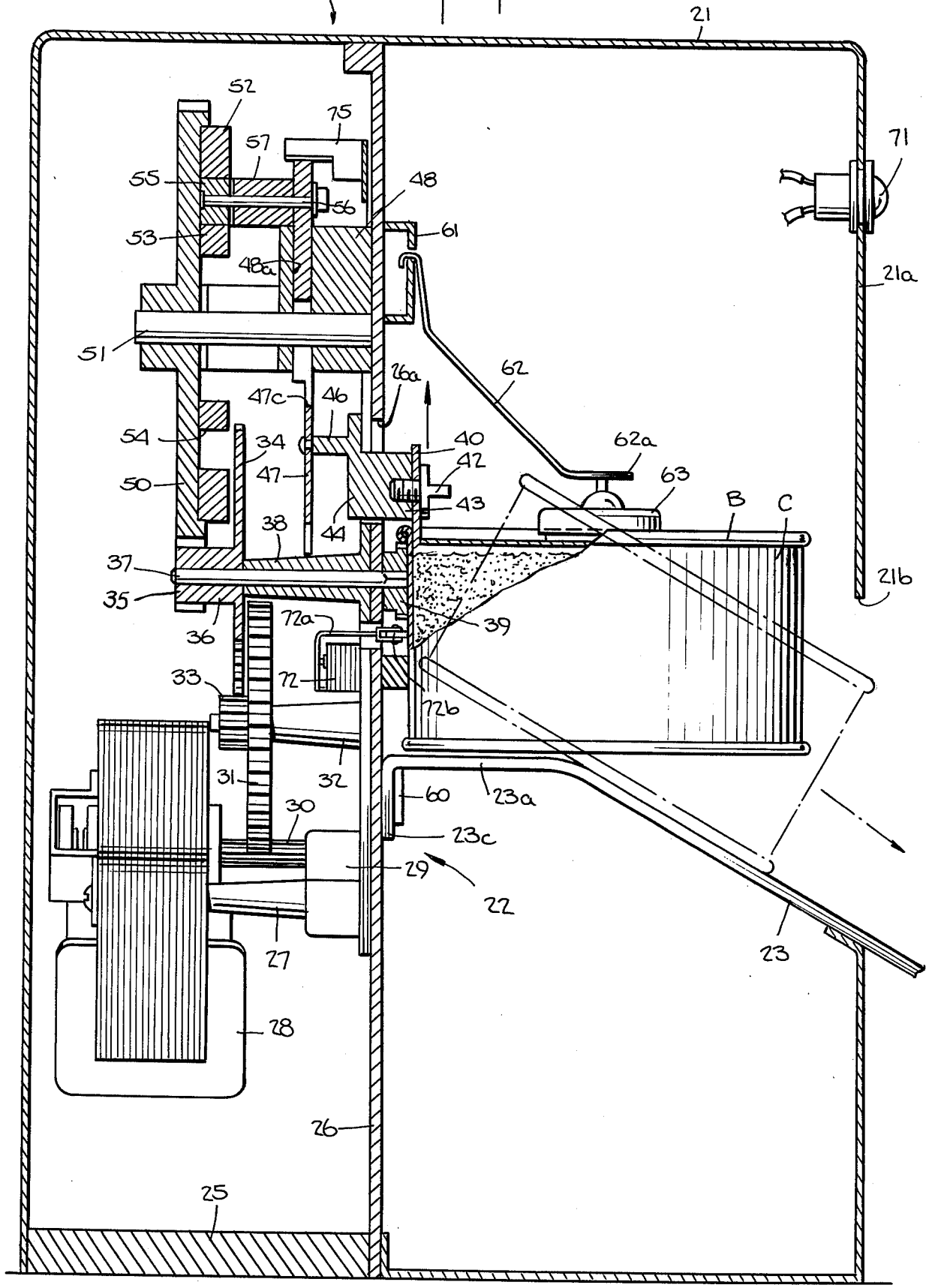

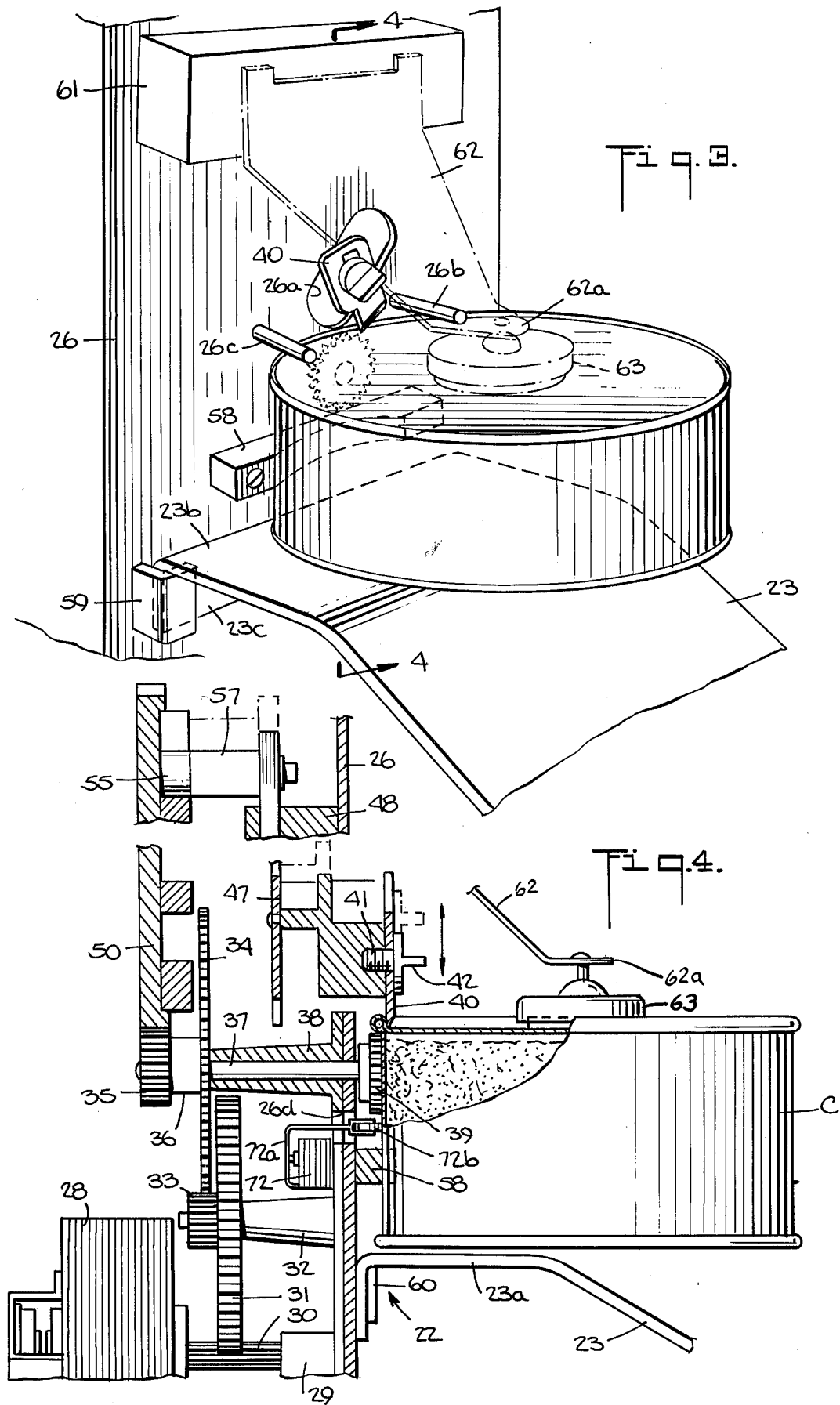

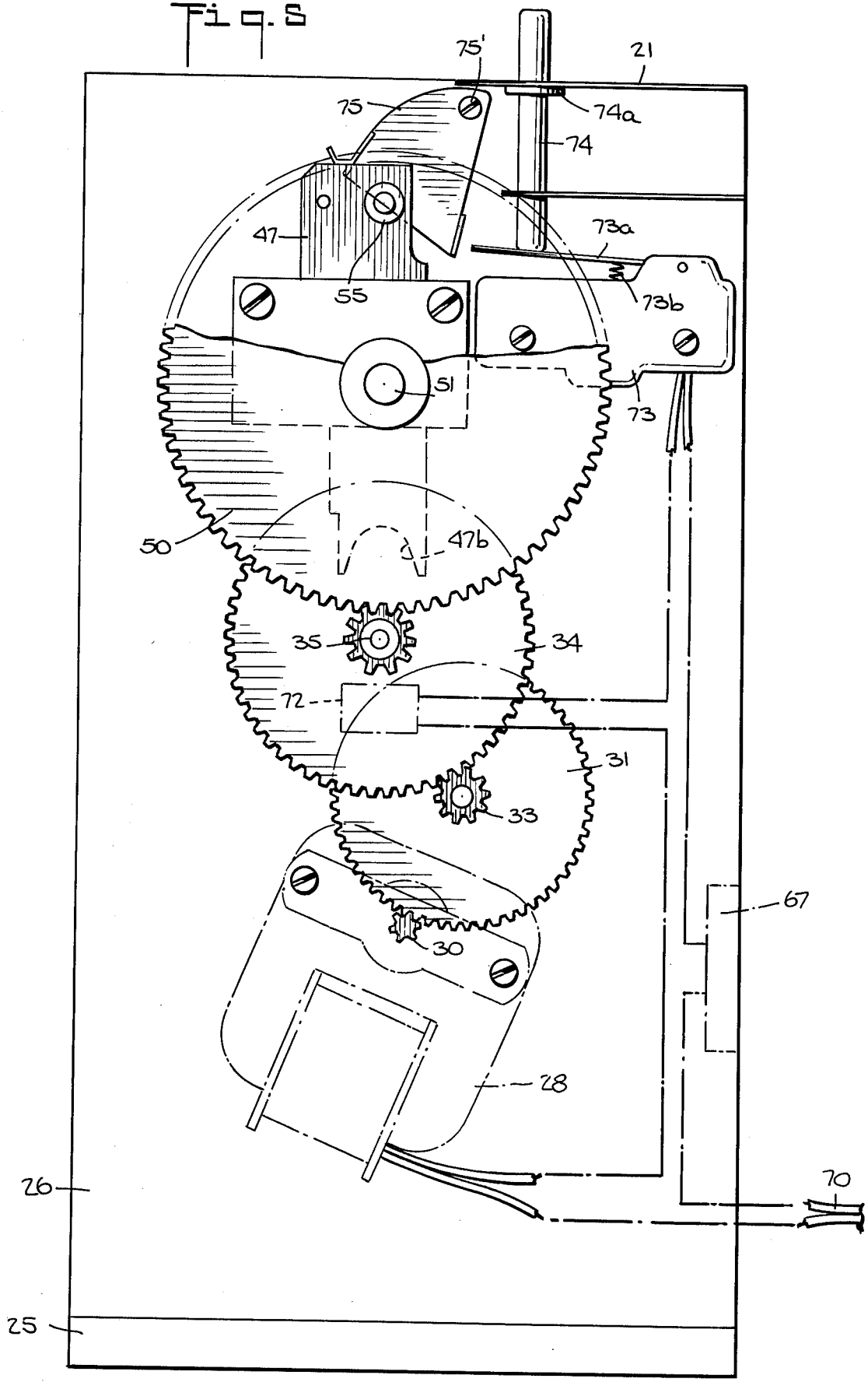

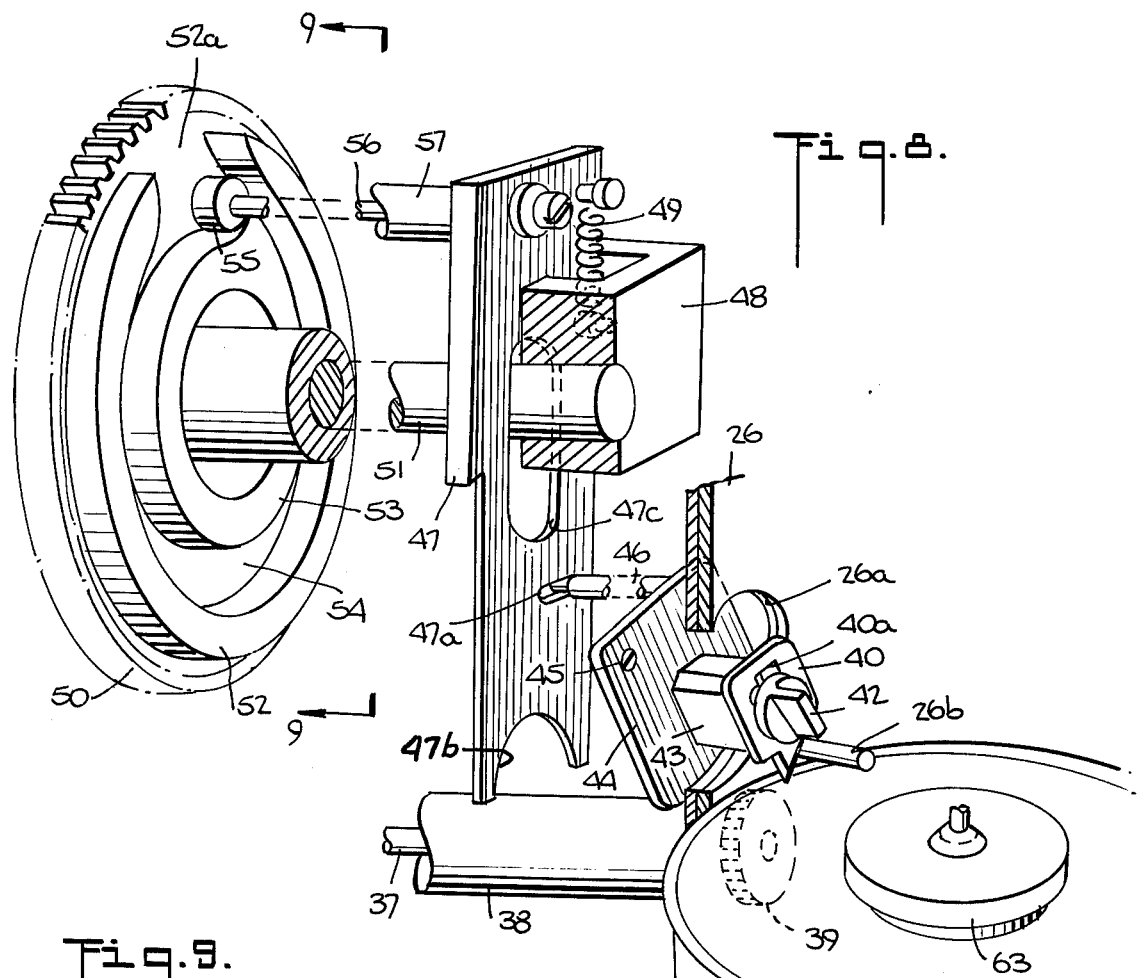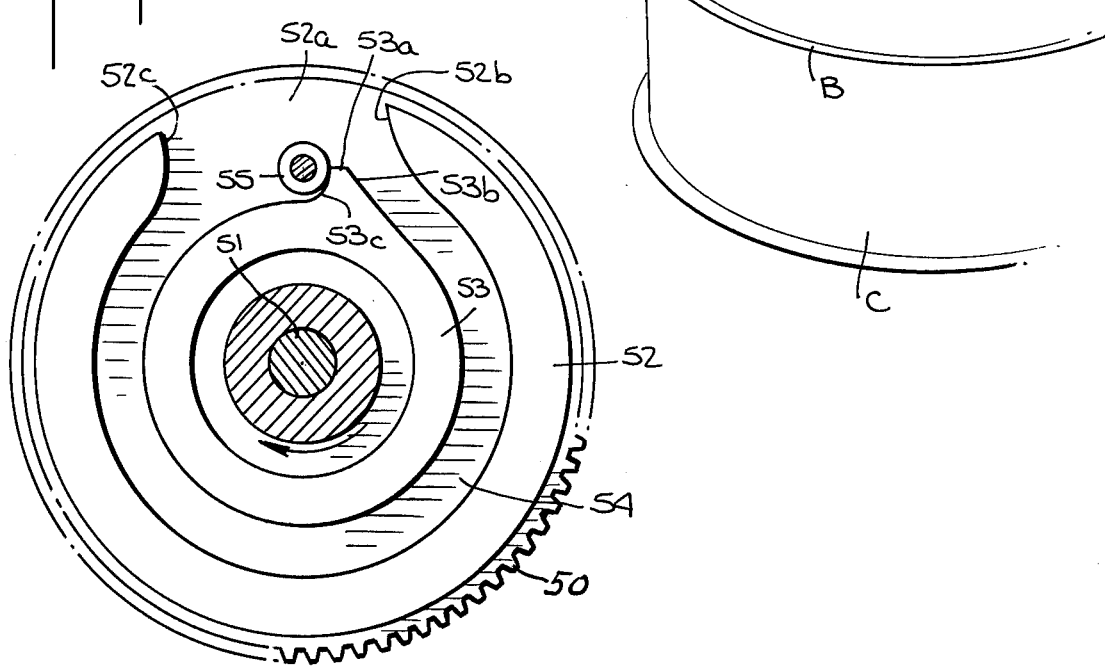

PET FEEDING APPARATUS

This invention relates to pet feeding apparatus, and in particular to an apparatus of this type which is adapted for use with hermetically sealed cans of pet food.

Animal pets are frequently left unattended by their owners for substantial periods of time while the owners are away from home. In the case of a cat, for example, an absence of as much as about 24 hours can be tolerated, since a cat can go that long without being fed. Where the anticipated absence will be of 2 days' duration, however, say a weekend fishing trip, the owner must make provision for one unattended feeding of the cat. Leaving the extra food in an opened can or in an open dish is not desirable, of course, because not only can the food spoil but there is no way of restraining the cat from eating it too soon.

The use of pet feeding apparatuses equipped with timing devices of some sort to achieve the desired control over when the food is made available to the pet has previously been suggested in the patent literature; see, for example, U.S. Pat. No. 1,961,008 to McEvoy, U.S. Pat. No. 2,189,213 to MacDonell, U.S. Pat. No. 3,720,186 to O'Rourke, and U.S. Pat. No. 3,780,702 to Waterbury. All of these apparatuses suffer from some disadvantages, however, chief among which is that the food is not under hermetic seal until the feeding time. On the one hand, in the McEvoy, O'Rourke and Waterbury apparatuses, open trays or pans are used for holding the food. In the MacDonell apparatus, on the other hand, though the food is dispensed directly out of cans which were initially hermetically sealed by the food processor, these have to be preopened at both ends (which may well be somewhat messy) in order to be used. Thus, in all of these apparatuses, even those of MacDonell and O'Rourke where special means are provided to cover the open ends of the various food receptacles temporarily until the time the animal is to get at the food, the food spoilage problem remains. Plural-shot feeders, of course, such as those MacDonell, O'Rourke and Waterbury, are subject to the further disadvantages that the respective mechanisms are fairly complex and thus relatively highly susceptible to breakdowns and malfunctions, and that the empty containers of necessity remain lying around open after the various feeding cycles have been completed so that food remnants therein can spoil, be spilled if the cans are accidentally upset by the animal, attract vermin, etc.

It is an important object of the present invention, therefore, to provide a novel pet feeding apparatus which will avoid the drawbacks and disadvantages of the aforesaid known types of pet feeding apparatuses.

A more particular object of the present invention is to provide a novel single-shot pet feeding apparatus in which the pet food can be maintained in its hermetically sealed can until such time as the pet is to be fed.

Generally speaking, the objectives of the present invention are achieved by an apparatus which includes an electric motor-driven can opener having a cooperative cutter blade and can-turning gear combination into which a sealed can of pet food can be loaded so that, with its upper peripheral bead confined between the turning gear and the cutter blade, the can will be retained in place without the cutter blade penetrating through the lid of the can. The apparatus further includes timer means controlling the energization circuit for the motor and presentable for the desired time interval at the end of which the pet is to be fed, means for automatically depressing the cutter blade so as to force it through the lid of the can at the start of the can-opening cycle and for automatically retracting the cutter blade from the can so as to release the latter at the end of the can-opening cycle, and a ramp structure for guiding the opened can, minus the magnetically retained severed lid thereof, to a receiving location where the can will be accessible to the animal to be fed.

In the presently contemplated best mode of practicing the present invention, the timer preferably is of the "run down" type which can be set for a given time interval and then runs down to zero. The switch controlled by the timer is mechanically ganged with the time setting knob and is arranged to be shifted into a first position where it is open in the motor energization circuit and closed in the energization circuit for the timer when the knob is turned to a time setting other than zero, and to be shifted into a second position where it is closed in the motor circuit and open in the timer circuit when the knob is at its zero setting. Concomitantly, the means for automatically depressing and raising the cutter blade comprises a vertically reciprocatable slide member supporting both the cutter blade and a cam follower, a rotary power gear driven by the motor, and a box cam secured to and rotatable with the power gear, the cam follower being received in the groove of the box cam. The arrangement is such that when the motor starts and turns the power gear, the cam first pushes the cam follower, and therewith the slide member, downwardly slightly from their rest position determined by the tip of the cutter blade resting on the lid of the can, thereby to force the cutter blade through the lid of the can. Subsequently, after the power gear has completed one revolution, a rise in the box cam causes the cam follower, and therewith the slide member, to be raised, thereby to retract the cutter blade from the can so as to release the same for movement along the ramp to the receiving location. To ensure proper starting and stopping of the motor, two normally open electric switches are provided in the motor energization circuit in addition to the timer-controlled switch, one being a microswitch arranged to be closed when a can to be opened is loaded into the can opener, and the other being a reset switch arranged to be closed by a push button which must be manually depressed before the start of each cycle. A latch is provided to hold the reset switch in its closed state, the latch being arranged to be automatically disengaged from the operating element of the reset switch by an adjunct of the slide member when the latter is raised at the end of the cutting cycle by the action of the box cam on the cam follower.

For purposes of esthetics as well as safety, i.e. to prevent the pet from touching and possible being injured by the can-opening mechanism, the apparatus normally also includes a housing for the can opener. The housing is provided with a slot-shaped opening in its front wall through which the ramp structure extends, the opening being of sufficient size to permit an opened can to pass therethrough as it slides along the ramp. The housing is further provided with a releasable and displaceable cover member in its upper front region overlying the location of the cutting mechanism, which member may be either a section of the housing itself or an adjunct thereof such as a lid or a door or the like, to provide access to the interior of the housing so as to permit loading of a can of pet food into the cutting mechanism. Also mounted on and accessible from the exterior of the housing are the timer-setting knob and dial, and the push button for closing the motor circuit-conditioning reset switch. If desired, an indicator light may be provided on the housing to show, by virtue of a suitable connection with the power circuit, that the timer has been set.

Among the advantages possessed by the apparatus according to the present invention are that it is simple in construction and operation and hence both inexpensive to produce and unlikely to suffer from breakdown or malfunction, that it is completely safe to the pet inasmuch as it has no open movable parts, that there is no need for separate food bowls or trays to be provided since the pet will eat directly from the original can, and that the food is maintained secure against spoilage since the can remains hermetically sealed until the appointed feeding time arrives.

The foregoing and other objects, characteristics and advantages of the present invention will be more clearly understood from the following detailed description thereof when read in conjunction with the accompanying drawings, in which:

FIG. 3 is a fragmentary, enlarged detail view, in perspective, of the cutting mechanism of the apparatus shown in FIG. 1, the front part of the housing being removed to illustrate details, and a can being shown loaded into the cutting mechanism but before the cutting operation has started;

FIG. 4 is a fragmentary sectional view taken along the line 4—4 in FIG. 3;

FIG. 5 is a rear elevational view of the apparatus with the back of the housing removed to show details of the gear drive for the can opener, the operating lever of the motor reset switch being shown unlatched and in its open or "off" position, and the push button for the switch being shown in its inactive or "up" position;

FIG. 7 is a fragmentary perspective view of the latch for the switch-operating lever;

FIG. 8 is a fragmentary perspective view of the apparatus with the housing and other parts removed to show details of the can-opening mechanism;

FIG. 9 is a sectional view taken along the line 9—9 in FIG. 8 and shows the power gear and box cam arrangement from the front.

Figure 1:
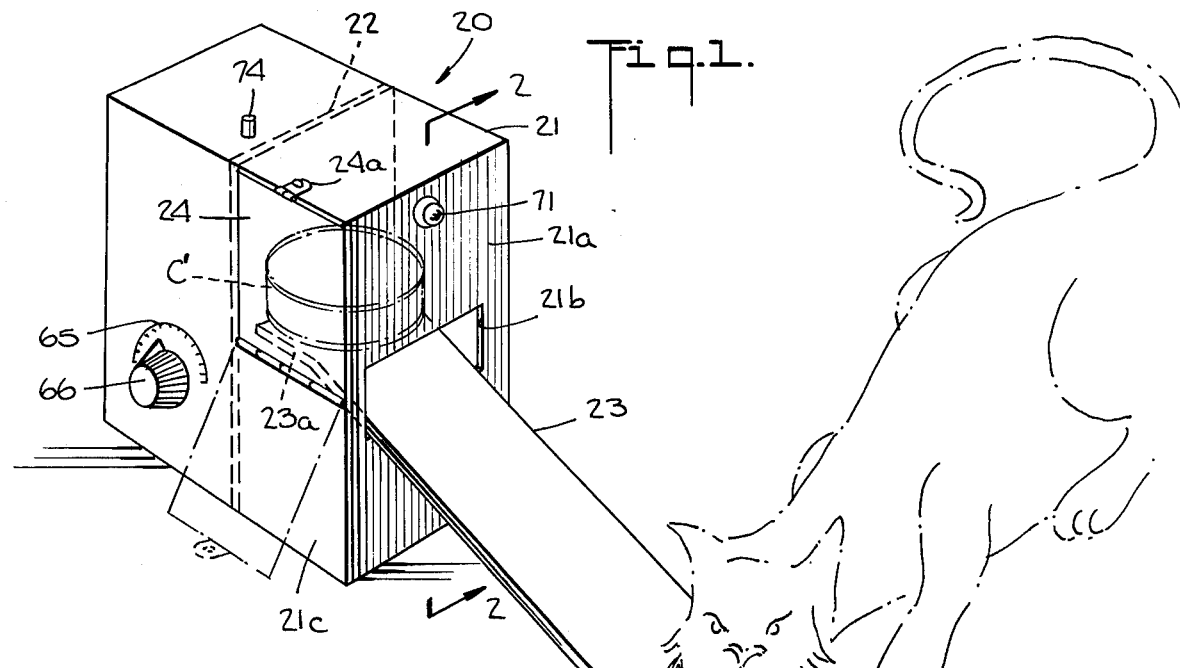
FIG. 1 is a generally schematic perspective illustration of a pet feeding apparatus according to the present invention and shows in solid lines an open can in the feeding position at the bottom end of the ramp, the can in its starting position and an open access door for loading the can into the cutting mechanism of the apparatus being shown in broken lines.

Referring now to the drawings in greater detail, there is shown in FIG. 1 a pet feeding apparatus 20 embodying the principles of the present invention. The apparatus includes a housing 21 (see also FIG. 2) within which is arranged a can opener 22 the structural elements of which will be more fully described presently. In its front wall 21a, the housing 21 is provided with a transverse rectangular opening 21b of a size sufficiently large to accommodate a ramp structure 23 and permit free passage thereover of an open can C of pet food from a platform section 23a to an upwardly flanged receiving or terminal section 23b. In the illustrated embodiment, the housing 21 is provided at one side wall 21c thereof with a hinged access door 24 arranged for movement between a closed position, shown in solid lines in FIG. 1, and an open position, shown in broken lines in FIG. 1. The door 24, through which a sealed can of pet food, designated C' in FIG. 1 and shown in phantom outline, can be loaded into the apparatus, has a suitable latch element 24a at its free edge arranged to cooperate with a corresponding element on the housing for holding the door in its closed position.

The can opener 22 (see FIGS. 2, 3 and 4) includes a framework consisting of a base 25 and a rigid vertical or upright plate or support member 26. Mounted on the framework by means of a suitable bracket structure 27 is an electric motor 28. The motor is shown as mounted on the support member 26, but it may, of course, just as readily be mounted on the base 25. Suitably journaled on the framework in a bearing 29 and driven by the motor 28 (see also FIG. 5) is a gear or pinion 30 of relatively small diameter which is in mesh with a larger spur gear 31 that is rotatably supported by a horizontal bracket 32 mounted on the support member 26. Arranged coaxially with the spur gear 31 and rotatable therewith is a small pinion 33 which meshes with a larger spur gear 34. The gear 34 and a smaller spur gear or pinion 35 are coaxially arranged on a hub 36 which is secured to one end region of a shaft 37 that is journaled in a bearing 38 secured to the support member 26.

At its other end, located to the front of the support member 26, the shaft 37 carries a knurled wheel or can-turning gear 39 of conventional construction, the toothed periphery of which is engageable in usual fashion with the underside of the upper peripheral bead B of a can C to be opened. The gear 39 is a part of the cutting mechanism of the apparatus and for that purpose is juxtaposed to a cutter blade 40 (see also FIG. 8) located frontwardly of the support member 26. The cutter blade 40 as shown is a straight-edged non-rotating element (although it could be a rotary wheel-type cutter just as well), and it is adjustably affixed, by means of a screw or bolt 41 having a knob-like head 42 and extending through a slot 40a in the body of the blade, to an arm or similar adjunct 43 of a plate 44. The plate 44 is located just rearwardly of the support member 26 and is pivotally mounted on the latter at 45 for swinging movement in a vertical plane, the arm 43 extending through an elongated, slightly arcuate, slot or opening 26a provided in the support member 26. By manipulating the knob or head 42, therefore, the cutter blade can be manually raised and lowered relative to the can-turning gear 39.

The apparatus also includes means for raising and lowering the cutter blade automatically. To this end, the plate 44 is linked by a rearwardly extending arm or pin 46 to a plate-shaped slide member 47, the latter having a small transverse slot 47a therein to accommodate the end of the arm 46. The slide member 47 is constrained to vertical reciprocal movement by a suitable guide and bearing bracket structure 48 secured to the support member 26 and defining a planar space 48a for accommodating the slide member. A tension spring 49 (shown in FIG. 8 only) anchored at its lower end to the bracket structure 48 and at its upper end to the slide member biases the latter and thereby the cutter blade downwardly. To avoid interference with such downward movement by the bearing 38, the slide member is arcuately recessed at 47b.

Arranged opposite the rear face of the slide member 47 is a large power gear 50 which is rotatably mounted on a shaft 51 journaled in the bearing and guide bracket structure 48, the slide member 47 having a vertical slot 47c to accommodate the shaft 51. The gear 50 is in mesh with the small spur gear 35. On its front face, the gear 50 carries a box cam constituted by a pair of generally concentric rails 52 and 53 defining a cam groove 54 therebetween (see also FIG. 9). The outer cam rail 52 is interrupted to provide a gap 52a between two outwardly rising portions 52b and 52c of the inside surface of the rail 52. In the region of the gap 52a, the inner cam rail 53 is provided with a rise 53a providing at one side of the latter an outwardly rising portion 53b of its outside surface opposite the rising surface portion 52b of the outer rail 52, and providing at the other side of the rise 53a an arcuate dropping portion 53c opposite the surface portion 52c of the outer rail. The box cam 52-53-54 cooperates with a cam follower 55 carried by the slide member 47 adjacent the upper end thereof. In the illustrated embodiment, the cam follower 55 is in the form of a small roller secured to a shaft 56 rotatably journaled in a tubular bearing 57 fixed to the slide member 47 in any suitable manner, the roller having a diameter just slightly less than the width of the groove 54 in the region of its constant width so as to fit smoothly slidably into the groove 54. The arrangement of the parts is such that whenever the cam follower roller 55 is located within and riding along the confines of the constant width portion of the groove 54, the slide member 47 is held (with no more than minimal play) in its downwardmost position so that thereby the cutter blade 40 is held in its downwardmost position relative to the can-turning gear 39 and with its cutting edge below the level of the lid of a can C being opened. When the cam follower roller 55 is located at the rise 53a of the inner cam rail 53, the slide member 47 is raised and the cutter blade is thereby also raised and retracted out of its operating position.

Fixed to the front face of the upright support member 26 below the can-turning gear 39 is a concavely contoured abutment bar 58 the purpose of which is to ensure that the can C to be opened is properly positioned with respect to the cutting mechanism. Below the abutment bar 58, there is further secured to the support member 26 a pair of spaced angle brackets 59 (FIG. 3) and 60 (FIGS. 2 and 4) which have their free web portions facing toward one another so as to define a channel between those web portions and the front face of the support member 26 for removably receiving a downwardly turned flange portion 23c of the platform section 23b of the ramp structure 23. The angle brackets are so arranged that when the ramp structure is installed as shown, the top surface of the platform 23b will be spaced slightly from the bottom of a can C held in the cutting mechanism and thus will not offer any frictional resistance to the turning of the can during the cutting operation.

Adjacent the cutting mechanism 39-40 there are provided on the support member 26 two can-leveling abutment pins 26b and 26c (see FIGS. 3 and 8), and above the mechanism a bracket 61 (see FIGS. 2 and 3) which removably supports in any suitable manner an arm 62 to the lowermost end section 62a of which a permanent magnet 63 is swivelly connected. The arrangement is such that when a can C to be opened is in position in the cutting mechanism, the pins 26c and 26d engage the bead B of the can from above and the magnet 63 rests medially on the lid of the can and is magnetically attracted thereto. By virtue of its connection to the arm section 62a, the magnet 63 will rotate with the can during the cutting operation, but that is not essential.

Figure 10:
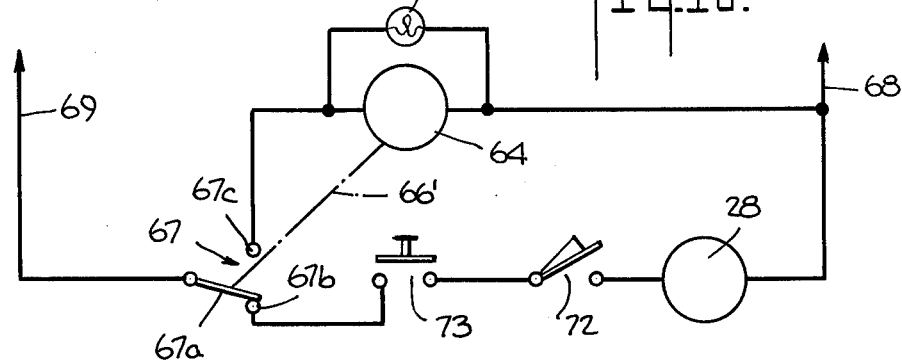
FIG. 10 is a schematic wiring diagram of the energization circuitry for the timer and the motor of the apparatus.

The apparatus 20 according to the present invention is further provided, as previously indicated herein, with a 0 to 24 hour timer 64 (see FIG. 10) for which a suitable numbered dial 65 and a time setting knob 66 are provided on the exterior of the housing 21 (see FIG. 1). As shown in FIG. 10, the timer 64 and the motor 28 are connected in parallel, but in mutually exclusive fashion as far as energization is concerned, through a common single-pole double-throw switch 67 to a suitable source of power, for example the standard 115 volt, 60-cycle house current line 68-69, via a standard electric power cord 70 (see FIG. 5). The switching element 67a of the switch 67 is preferably mechanically ganged with the timer knob 66, as indicated by the broken line 66', so as to be in contact with the switch terminal 67b in the motor energization circuit whenever the timer is at or has run down to its "0" setting, and so as to be in contact with the switch terminal 67c only and whenever the knob 66 has been turned to a finite time setting for the timer 64. As further shown in FIG. 10, a suitable small indicator or pilot lamp 71, which is mounted on and visible from the exterior of the housing 21 (see FIG. 1), is connected across the timer 64 so that it will be lit whenever the timer has been set for a given time.

The energization circuit for the motor 28 further includes, in addition to the switch 67, a normally open microswitch 72 and a normally open reset switch 73. The microswitch 72 is mounted on the rear face of the support member 26, advantageously behind the can-positioning abutment bar 58 (see FIGS. 2 and 4), and has a switch-operating element 72a extending through an opening 26d in the support member 26 to a point where a small roller 72b carried by the element 72a will be engaged, with sufficient force to displace the latter into its switch-closing state, by a properly positioned can C. The reset switch 73, on the other hand, is mounted in the upper region of the support member 26 and has an operating element 73a which is biased to its switch-opening state by a small spring 73b. The element 73a adjacent its free end bears against the lowermost tip of a plunger or push button 74 the top end region of which protrudes above the top of the housing 21 (see FIGS. 1 and 5), upward movement of the push button or plunger 74 beyond a certain point being inhibited by a flange or washer 74a secured to the plunger intermediate its ends. Depression of the push button thus will close switch 73. The electrical interconnections between the motor 28, the switches 67, 72 and 73, and the power source 68-69 are also shown in broken lines in FIG. 5.

Figure 6:
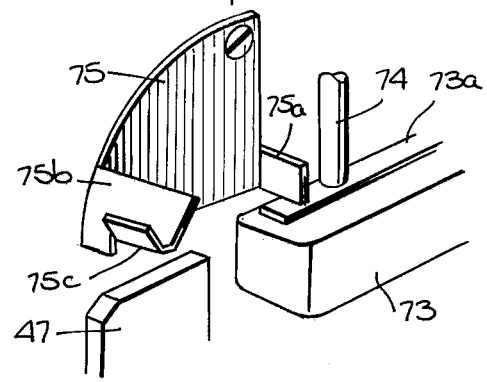
FIG. 6 is an elevational view of the push button and the latch in their active or "down" positions for holding the switch lever in its closed or "on" position.

Pivotally mounted on the rear face of the support member 26 at 75' adjacent the plunger 74, for swinging movement in a vertical plane parallel to the support member 26, is a latch member 75 (see FIGS. 5, 6 and 7). The latch member is shown as being in the form of a generally triangular segment-shaped plate having a transversely extending lug 75a at one of its free corners and a transversely extending lug 75b, partly cut and bent upwardly so as to define a cam surface 75c, at its other free corner. When the switch-operating element 73a is in its "up" position and the slide member 47 is in its downwardmost position, the lug 75a rests against the free edge of the switch element. On the other hand, when the push button 74 is depressed to move the element 73a to its "down" position, the latch member 75, under its own weight and because of the location of its pivot points, swings downwardly (counterclockwise as seen in FIGS. 6 and 7) and brings the lug 75a into a position where it extends across the top of the element 73a, thereby preventing upward movement of the latter and keeping the switch 73 closed. Thereafter, when the slide member 47 is raised, it (or an adjunct thereof) engages the cam surface 75c of the latch member 75 and swings the latter upwardly (in a clockwise direction as seen in FIGS. 6 and 7) so as to retract the lug 75a from the switch-operating element 73a and permit the latter to move upwardly under the force of the spring 73b so as to open the switch 73.

When the apparatus 20 is to be used, the door 24 is opened (alternatively housing may be constructed so that either its upper front section or a top cover amy be either removed or hinged back), and a still sealed can C of pet food is loaded into the apparatus. To this end, the box cam 52-53-54 must be in the position shown in FIGS. 8 and 9, so that the cam follower roller 55 is located in the region of the gap 52a of the outer cam rail 52 and preferably adjacent the dropped portion 53c of the outer surface of the inner cam rail 53. In the loading operation, the cutter blade 40 is first raised manually through the intermediary of the knob 42, which also raises the slide member 47 and results in the latch member 75 being swung over to the position shown in FIG. 5, and the can is then fitted against the abutment bar 58 and the gear 39 so as to have the upper bead B of the can resting on the knurled surface of the gear 39. Finally, the cutter blade is lowered again until the tip of its cutting edge rests on, but does not penetrate through, the lid of the can (see FIGS. 3 and 4). This in conjunction with the tilt-inhibiting action of the pins 26b and 26c serves to hold the can steady in the cutting mechanism, with the bottom of the can spaced slightly from the platform portion 23a of the ramp structure 23.

With the magnet 63 resting on the lid of the can, the door 24 is then closed, the electric cord 70 is plugged into a wall socket, the timer knob 66 is turned to the desired time setting, say 24 hours, and the push button 74 is depressed. As will be apparent from the circuit diagram of FIG. 10, however, the motor will still remain deenergized despite the fact that the switches 72 and 73 are already closed, the former because the body of the can is pressed against the roller 72b, and the latter because its operating element 73a is held in its "down" position (shown in FIG. 6) by the latch member 75. The motor cannot start because the switch element 67a of the switch 67 was shifted to the terminal 67c for energizing the timer 64. This condition will obtain for as long as the timer is running down.

Figure 2:
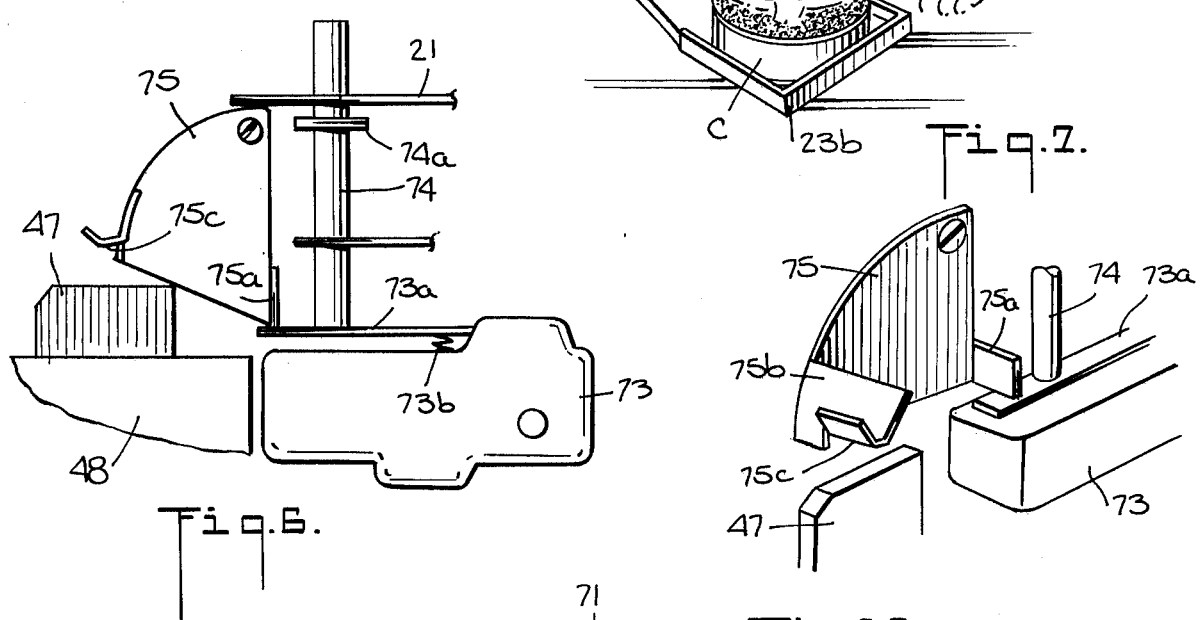
FIG. 2 is a sectional view taken along the line 2—2 in FIG. 1 and shows the can during a cutting operation, the start of the downward sliding movement of the can along the ramp at the end of the cutting operation being indicated in phantom outline.

When the timer ultimately reaches its "0" state, the switch element 67a is automatically shifted over to the terminal 67b of the switch 67. This completes the energization circuit for the motor and permits the same to start. Through the intermediary of the gear train 30-31-33-34, therefore, the can-turning gear 39 is set into rotation to begin revolving the can around its axis. At the same time, the power gear 50 is set into rotation, in the direction of the arrow shown in FIG. 9, through the intermediary of the gear train 30-31-33-34-35. During the initial part of this movement of the power gear, while the cam follower roller 55 is still in the region of the gap 52a of the cam rail 52, the tip of the cutter blade 40 rides along the top surface of the lid of the can and the cam follower roller is raised somewhat from the outer surface of the inner rail 53, as shown in FIGS. 4 and 9.

when the surface portion 52c of the outer cam rail 52 reaches the location of the cam follower roller 55, however, it engages the latter and forces it downwardly, which displaces the slide member 47 to its downwardmost position and thereby forces the cutter blade downwardly so as to cause it to penetrate through the lid of the can, as shown in FIG. 2. As the rotation of the can then continues, the lid is severed from the can. The gear ratios are, of course, so chosen that the can will have completed at least slightly more than one full revolution (to ensure complete severing of the lid of the can) before the power gear has rotated sufficiently to bring the portion of the groove 54 just preceding the rise 53a of the inner cam rail 53 to the location of the cam follower roller 55.

As the power gear then continues to rotate, the cam follower roller is displaced upwardly between the rising surface portions 52b and 53b of the cam rails 52 and 53. The slide member 47 thus is raised and causes the cutter blade 40 to be retracted from in front of the upper bead B of the can. This releases the can and permits it, minus its severed lid which is retained by the magnet 63, to drop down onto the platform portion 23a of the ramp structure 23. The width of the platform portion 23a is, however, slightly less than the diameter of the can, so that when the can hits the platform it immediately tilts forwardly under its own weight and begins its sliding movement down the ramp 23 until it comes to rest in the flanged receiving section 23b where the pet is able to eat directly from the can.

As the cam follower 55 reaches the top of the rise 53a of the inner cam rail 53, the slide member 47 engages the cam surface 75c of the latch member 75 and swings it upwardly so as to withdraw the lug 75a from the operating element 73a of the reset switch 73. The latter thus is opened at just about the same time as the microswitch 72 is opened when the can C leaves the cutting location, whereby the energization circuit for the motor 28 is broken. By virtue of the inertia inherent in the system, however, the power gear will continue to rotate somewhat, to a degree sufficient to move the cam rise 53a past the cam follower roller 55 and to permit the latter to drop down onto the outer surface portion 53c of the inner cam rail 53. Although ordinarily it will not be necessary, if it is found that this after movement is so great as to cause the cam surface portion 52c of the outer cam rail to reach the location of the roller 55, a suitable electromagnetic brake adapted to act on the power gear 50 when the motor is deenergized may be incorporated in the system.

It will be apparent from the foregoing that when the owner of the pet returns, the only items requiring removal will be one empty can C and the lid thereof still retained by the magnet 63 in the housing 21. Moreover, because the owner's return will have taken place in time for the next feeding of the pet, the can will not have been standing open for a sufficiently long time to permit the creation of such usually objectionable odors as are normally incident to spoiled food, which would certainly be present in the case of multiple feedings over a relatively long period of time. The safety features of the apparatus will also be recognized, since not only is there no way the pet can get at and be injured by the operating parts before the can has been opened, but once the opened can has been released the apparatus cannot be started up again until the push button 74 is depressed, and even then only after a can has been loaded into the cutting mechanism and the timer has again been set for a finite running time.

The present invention thus is seen to provide an apparatus for, at the end of a present time interval, automatically providing food to a pet directly out of an initially hermetically sealed can in which the food was purchased. In its broadest sense, therefore the apparatus includes can opener means including a cutter blade mounted for reciprocal movement into and out of a cutting location, motor means for revolving a can to be opened when the can is disposed at the cutting location, timer means settable for a desired time interval at the end of which a pet is to be fed and operable to control the motor means so as to permit activation thereof only at the end of the set time interval, power means operable conjointly with the motor means for sequentially forcing the cutter blade through the lid of the can concomitantly with the revolving thereof and, after the lid has been severed, retracting the cutter blade from the can to release the latter, and a ramp structure for supporting the opened can upon release thereof and guiding it to a receiving location at which it is accessible to the pet. In a particularly advantageous refinement of the invention, the power means comprises cam and cam follower means operated by the motor means for effecting the aforesaid actions of the cutter blade as well as the subsequent deactivation of the motor means concurrently with the release of the can.

It will be understood that the foregoing description of a preferred embodiment of the present invention is for purposes of illustration only, and that the various herein disclosed structural and operational features and relationships are susceptible to a number of modifications and changes none of which entails any departure from the spirit and scope of the present invention as defined in the hereto appended claims. Merely by way of example, the cutter blade could be a rotary element rather than a stationary one as shown. The gear and cam combination for forcing the cutter blade down and retracting it up could be replaced by a solenoid operator suitably connected into the motor energization circuit and acting on the blade-holding slide member. Still other variations will readily suggest themselves to those skilled in the art.

What I claim is:

1. A pet feeding apparatus for use with hermetically sealed cans of pet food, comprising can opener means including a cutter blade mounted for reciprocal movement into and out of a cutting location, motor means for revolving a can to be opened when the same is disposed at said cutting location, timer means settable for a desired time interval at the end of which a pet is to be fed and operable to control said motor means so as to permit activation thereof only at the end of said time interval, power means operable conjointly with said motor means for sequentially reciprocally displacing said cutter blade so as to first force said cutter blade through the lid of said can concomitantly with the revolution thereof and, after the lid has been severed, then retract said cutter blade from said can to release the latter, and a ramp structure for supporting the opened can upon release thereof and guiding it to a receiving location at which it is accessible to the pet.

2. A pet feeding apparatus according to claim 1, further comprising reset means operable manually to permit activation of said motor means and operable automatically in response to the retraction of said cutter blade for reactivating said motor means.

3. A pet feeding apparatus according to claim 2, wherein said motor means comprises an electric motor and an energization circuit therefor, said timer means comprises a first switch connected in said energization circuit and arranged to be open when said timer means is set for said time interval and closed at the end of the time interval, and said reset means comprises a normally open second switch connected in said energization circuit, button means for closing said second switch, releasable latch means operable when engaged for holding said second switch closed, and means connected with said cutter blade for releasing said latch means upon retraction of said cutter blade.

4. A pet feeding apparatus according to claim 3, further comprising a normally open third switch connected in said energization circuit and arranged to be closed by said can when the same is disposed at said cutting location.

5. A pet feeding apparatus according to claim 1, wherein said power means comprises cam and cam follower means.

6. A pet feeding apparatus according to claim 1, wherein said power means comprises gear means driven by said motor means, cam means operated by said gear means, and reciprocally movable cam follower means connected with said cutter blade and responsive to said cam means for effecting the reciprocal displacements of said cutter blade.

7. A pet feeding apparatus according to claim 6, further comprising a reciprocally movable slide member carrying said cutter blade, and wherein said gear means includes a power gear, said cam means includes a box cam carried by said power gear at one face thereof and defining a circumferentially extending cam groove which is of constant radial width and concentric with said power gear over substantially the entire extent of said groove but has a radially outwardly rising portion at a circumferentially relatively small region along its length, and said cam follower means includes a roller carried by said slide member and received in said groove of said box cam, said roller having a diameter only slightly smaller than the radial width of said groove.

8. A pet feeding apparatus according to claim 7, further comprising reset means operable manually when said rising portion of said groove of said box cam is not at the location of said roller to permit activation of said motor means and operable automatically in response to movement of said rising portion of said groove past said roller and the resultant retraction of said cutter blade for deactivating said motor means.

9. A pet feeding apparatus according to claim 8, wherein said motor means comprises an electric motor and an energization circuit therefor, said timer means comprises a first switch connected in said energization circuit and arranged to be open when said timer means is set for said time interval and closed at the end of that time interval, and said reset means comprises a normally open second switch connected in said energization circuit, push button means for closing said second switch, releasable latch means operable when engaged for holding said second switch closed, and said slide member having an adjunct thereof operable when raised by said roller for displacing said latch means out of its engaged state upon retraction of said cutter blade, said latch means being movable to said engaged state only upon said roller being in a portion of said groove other than said rising portion and upon depression of said push button means.

10. A pet feeding apparatus according to claim 9, further comprising a normally open third switch connected in said energization circuit and arranged to be closed by said can when the same is disposed at said cutting location.

11. A pet feeding apparatus for use with hermetically sealed cans of pet food, comprising an electric motor-driven can opener having a can-turning gear and a cooperating retractable cutter blade jointly constituting a cutting mechanism for opening a sealed can loaded thereinto without penetration of the can lid by the cutter blade, timer means settable for a desired time interval and controlling the motor energization circuit to keep the motor inactive until the end of the set time interval, means for conditioning the motor circuit to enable ultimate energization thereof by the timer means, power means operable conjointly with the motor, when the same is energized, for sequentially forcing the cutter blade through the can lid, holding it there as the can revolves to effect the severing of the lid, and retracting it from the fully opened can to release the same and simultaneously effect the deenergization of the motor, and a ramp structure for supporting the opened can upon release thereof from the cutting mechanism and guiding it to a receiving location where it will be accessible to the pet to be fed.

12. A pet feeding apparatus according to claim 11, wherein the power means comprises a gear-driven cam and an associated cam follower for effecting the sequential actions of the cutter blade as well as the opening of the motor energization circuit concurrently with the release of the can.

* * * * *

UNITED STATES PATENT AND TRADEMARK OFFICE
CERTIFICATE OF CORRECTION

PATENT NO. : 4,077,360
DATED : March 7, 1978
INVENTOR(S) : Anthony G. Figlia

It is certified that error appears in the above-identified patent and that said Letters Patent are hereby corrected as shown below:

In the listing of References Cited, for "Waterburg" read --Waterbury--. Column 1, line 41, after "those" read --of--; line 68, for "presentable" read --presettable--. Column 2, line 54, for "possible" read --possibly--. Column 7, line 22, for "amy" read --may--. Column 8, line 8, for "when" read --When--. Column 9, line 10, for "present" read --preset--. Column 10, line 7, for "reactivating" read --deactivating--.

Signed and Sealed this

Eighteenth Day of July 1978

[SEAL]

Attest:

RUTH C. MASON
Attesting Officer

DONALD W. BANNER
Commissioner of Patents and Trademarks